P. WEYMANN & G. GILLITZER.
CORN PLANTER.
APPLICATION FILED NOV. 26, 1912.

1,097,574.

Patented May 19, 1914.

Witnesses:
Hugo Gillitzer
Wm. Berohenger

Inventors:
Peter Weymann
Guido Gillitzer

COLUMBIA PLANOGRAPH CO., WASHINGTON, D. C.

UNITED STATES PATENT OFFICE.

PETER WEYMANN AND GUIDO GILLITZER, OF SPRING HILL, MINNESOTA.

CORN-PLANTER.

1,097,574.     Specification of Letters Patent.     Patented May 19, 1914.

Application filed November 26, 1912. Serial No. 733,680.

*To all whom it may concern:*

Be it known that we, PETER WEYMANN and GUIDO GILLITZER, citizens of the United States, residing at Spring Hill, in the county of Stearns and State of Minnesota, have invented a new and useful Improvement on Corn-Planters, of which the following is a specification.

This invention relates to improvements in corn planters, and it has for its object to provide simple and improved mechanism for operating the checking shaft of the corn planter so that the seed may be deposited at regular intervals.

A further object of the invention is to provide simple and improved mechanism for check rowing corn without the use of a wire and to relieve the corn planter of the side draft caused by the use of the wire.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

Figure 1:
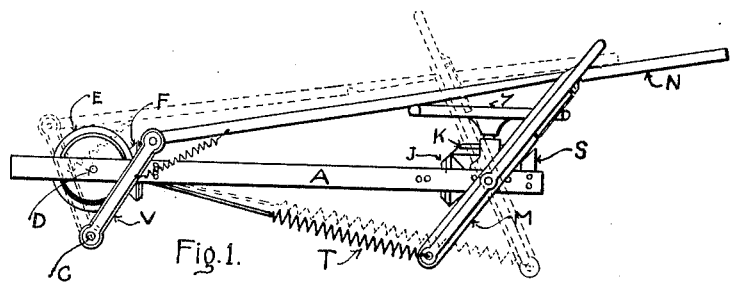
Figure 2:
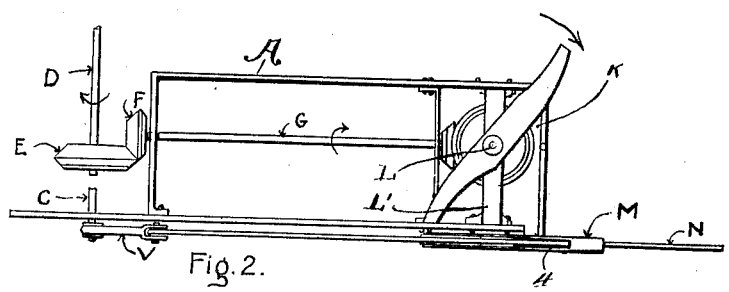
Figure 3:
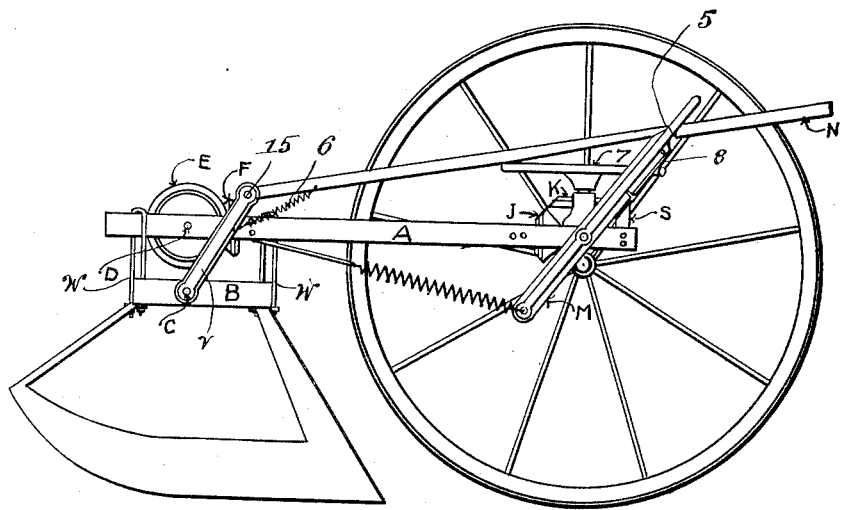

In the drawing,—Figure 1 is a view in side elevation of a device embodying our invention. Fig. 2 is a plan view of the same. Fig. 3 is a side view, showing the device attached to a corn planter.

Corresponding parts in the several figures are denoted by like characters of reference.

The frame A of our improved attachment is connected with the runner and frame B of the planter by means such as clip bolts W. The frame A supports a longitudinal shaft G having at its forward end a bevel pinion F meshing with the bevel pinion E on the drilling shaft D of the planter. The rear end of the shaft G has a bevel pinion J meshing with a bevel gear K on a vertical shaft L which is mounted for rotation in cross bars of the frame, one of said cross bars being seen at L'. The drilling shaft D is driven from the main axle of the corn planter by suitable transmission means not specifically shown. Motion is transmitted from the shaft D by the means herein described to the vertical shaft L which carries at its upper end oppositely extending radial arms 7.

Fulcrumed at one side of the frame A is a lever M having at its upper end a slot 4 through which is guided a rod or bar N, the forward end of which is pivotally connected at 15 with a crank arm V which is mounted on the rock shaft C, which latter is journaled on the runner frame and extends in the customary manner through the seed boxes (not shown) for the purpose of actuating the seed dropping mechanism. The rod or bar N has in the under edge thereof a beveled notch 5 which is adapted to be engaged by the end wall at the lower extremity of the slot 4 in the lever M. The upper end of said lever is actuated in a rearward direction by the action of a retracting spring T which connects the lower end of said lever with the forward portion of the frame. A spring 6 connects the rod or bar N with the crank arm V for the purpose of maintaining the lower edge of said bar having the notch 5 in engagement with the lower end wall of the slot 4 in the lever M without depending entirely on the gravity of the bar N. The lever M is provided with a roller 8 to receive the impact of the arms 7. A stop member S is disposed in the path of the upwardly extending arm of the lever M.

In the operation of this invention when the machine travels over the ground, the shaft L carrying the arms 7 is rotated in the direction indicated by an arrow in Fig. 2, and the arms 7 will successively engage the anti-friction roller 8 on the lever M, rocking the upwardly extending arm of said lever in a forward direction and tensioning the spring T. When the lever M approaches the limit of its movement, the lower end wall of the slot in its upwardly extending arm will engage the notch 5 in the bar N. As soon as this engagement has taken place, the arm 7 passes out of engagement with the lever M, which latter is now retracted by the action of the spring T to its initial position, carrying along with it the bar N, the latter serving to rock the shaft C in one direction. By striking the stop member S, the lever M is suddenly jarred sufficiently to disengage the notch 5 of the arm N from the lower end wall of the slot 4, and the rock shaft C having the crank V together with the bar N are now restored to their initial position, while the lever M is presently engaged by the other arm 7 for a repetition of the operation.

It may be remarked that in the drawings, Figs. 1 and 3 illustrate in full lines the position of the lever M just after becoming disengaged from one of the arms 7 and almost but not entirely retracted by the action of the spring T, the stop member 6 having not yet been reached for the purpose of jarring loose the bar N. The latter, however, has been shown in dotted lines in the retracted and initial position to which it will be returned as soon as the upwardly extending arm of the lever M engages the stop member S.

Having thus described the invention, what is claimed as new, is:—

1. In a check rowing device for corn planters, a frame, an upright shaft journaled therein and having radially extending arms, means for driving said shaft, a lever fulcrumed on the frame and having an upwardly extending arm lying in the path of the radial arms carried by the shaft and having a slot, a retracting spring for said lever, a seeder shaft supported for oscillation and having a crank, and a bar pivotally connected with the crank and extending through the slot in the upwardly extending lever arm, said bar having a beveled notch for engagement with the lower end wall of said slot; and means for disengaging the bar from the end wall of the slot when the lever reaches the limit of its movement in one direction.

2. In a check rowing device for corn planters, a frame, a vertically disposed driven shaft journaled therein and having radially extending arms, a lever fulcrumed in the frame and having an arm extending upwardly in the path of the arms carried by the shaft, said upwardly extending arm having an anti-friction roller and a slot, a retracting spring for the lever, a seeder shaft supported for oscillation and having a crank, a bar pivotally connected with the crank and guided through the slot in the upwardly extending lever arm, said bar having a beveled notch, a spring connecting the bar with the crank to maintain the notched edge of said bar in engagement with the slot in the lever arm, and a stop member supported in the path of the upwardly extending lever arm to receive the impact thereof when retracted by the spring.

PETER WEYMANN.
GUIDO GILLITZER.

Witnesses:
ALBERT JACOBS,
CELIA GILLITZER.

---

Copies of this patent may be obtained for five cents each, by addressing the "Commissioner of Patents, Washington, D. C."